Sept. 25, 1956 R. L. DEGA 2,763,982
CENTRIFUGAL APPARATUS FOR TREATING EXHAUST GAS
Filed Jan. 29, 1952 2 Sheets-Sheet 2
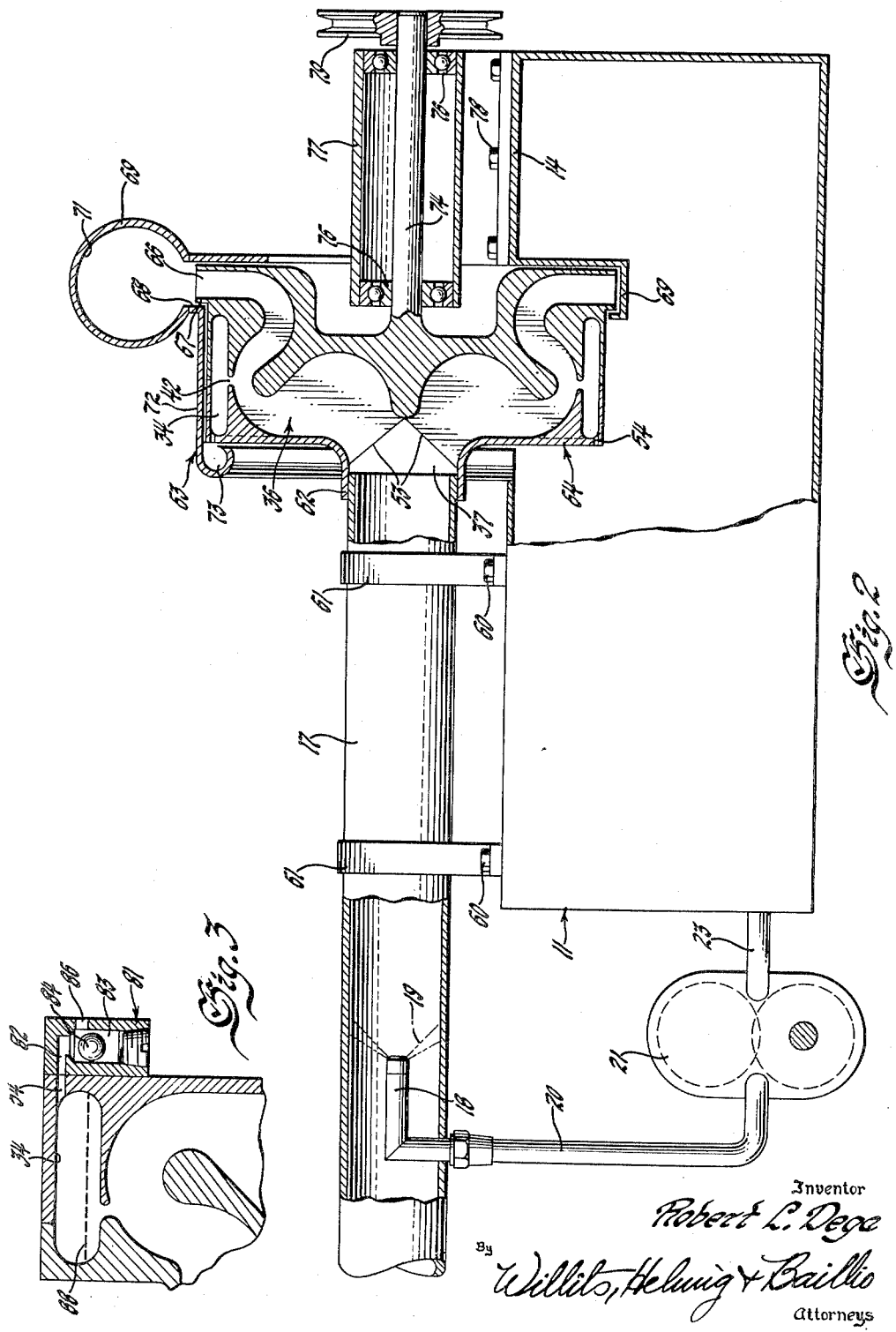
Inventor
Robert L. Dega
By Willits, Helmig & Baillio
Attorneys United States Patent Office 2,763,982
Patented Sept. 25, 1956

2,763,982
CENTRIFUGAL APPARATUS FOR TREATING EXHAUST GAS

Robert L. Dega, Royal Oak, Mich., assignor to General Motors Corporation, Detroit, Mich., a corporation of Delaware Application January 29, 1952, Serial No. 268,896

6 Claims. (Cl. 60—30)

The invention relates to an apparatus for treating exhaust gas from internal combustion engines; particularly, to an apparatus for quenching inflammable particles in the exhaust gas and for thereafter centrifugally separating from the exhaust gas the quenching liquid employed, the various substances absorbed from the exhaust gas by the liquid and the condensed liquids resulting from the cooling of the exhaust gas by the quenching liquid.

It is proposed to spray water or other suitable liquid into the exhaust conduit leading from an engine and then to centrifugally or otherwise separate this liquid, condensed liquid and other substances from the exhaust gas prior to the time the exhaust gas is discharged into the atmosphere. The liquid so separated is then collected in the supply tank from which the liquid is sprayed into the exhaust conduit.

An object of the invention is to eliminate the hazard involved in the use of engines, particularly diesel engines, in mines, forests, and elsewhere where the exhaust gas may contaminate the air or may contain inflammable particles which may cause fires or explosions.

It is particularly desirable to provide an apparatus for removing aldehydes from the exhaust gas of internal combustion engines which may be used in confined areas such as mines, where the exhaust gas may be mixed with air where workmen are employed. Aldehyde vapors are known to very irritating to the skin and eyes.

It is also an object of the invention to provide an apparatus for quenching the exhaust gas in engines used in forests and other areas where fires may be started.

The apparatus employed involves a tank from which water may be sprayed into the exhaust conduit of an engine. Beyond the spray apparatus and adjacent the discharge end of the exhaust conduit, a centrifugal separator is employed for separating liquids and other substances from the exhaust gas prior to the discharge thereof into the atmosphere. The water sprayed into the conduit will not only cool the exhaust gas sufficiently to prevent damage from any incandescent particles therein but it will absorb various objectionable substances such as aldehydes. The cooling of the exhaust gas also will result in the condensation of water and other vapors therein and all of which will be removed by the centrifugal separator prior to the time the exhaust gas is discharged into the atmosphere. The separated liquids are returned to the supply tank and are recirculated throughout the system until the supply of liquid becomes sufficiently contaminated that the tank should be emptied and refilled with clean water.

Figure 2 is a view partly in section and partly in elevation of an exhaust gas treating apparatus diagrammatically illustrating another form which the invention may assume.

Figure 3 is a fragmentary sectional view showing another form of liquid discharge means for the apparatus disclosed by Figures 1 and 2.

Figure 1:
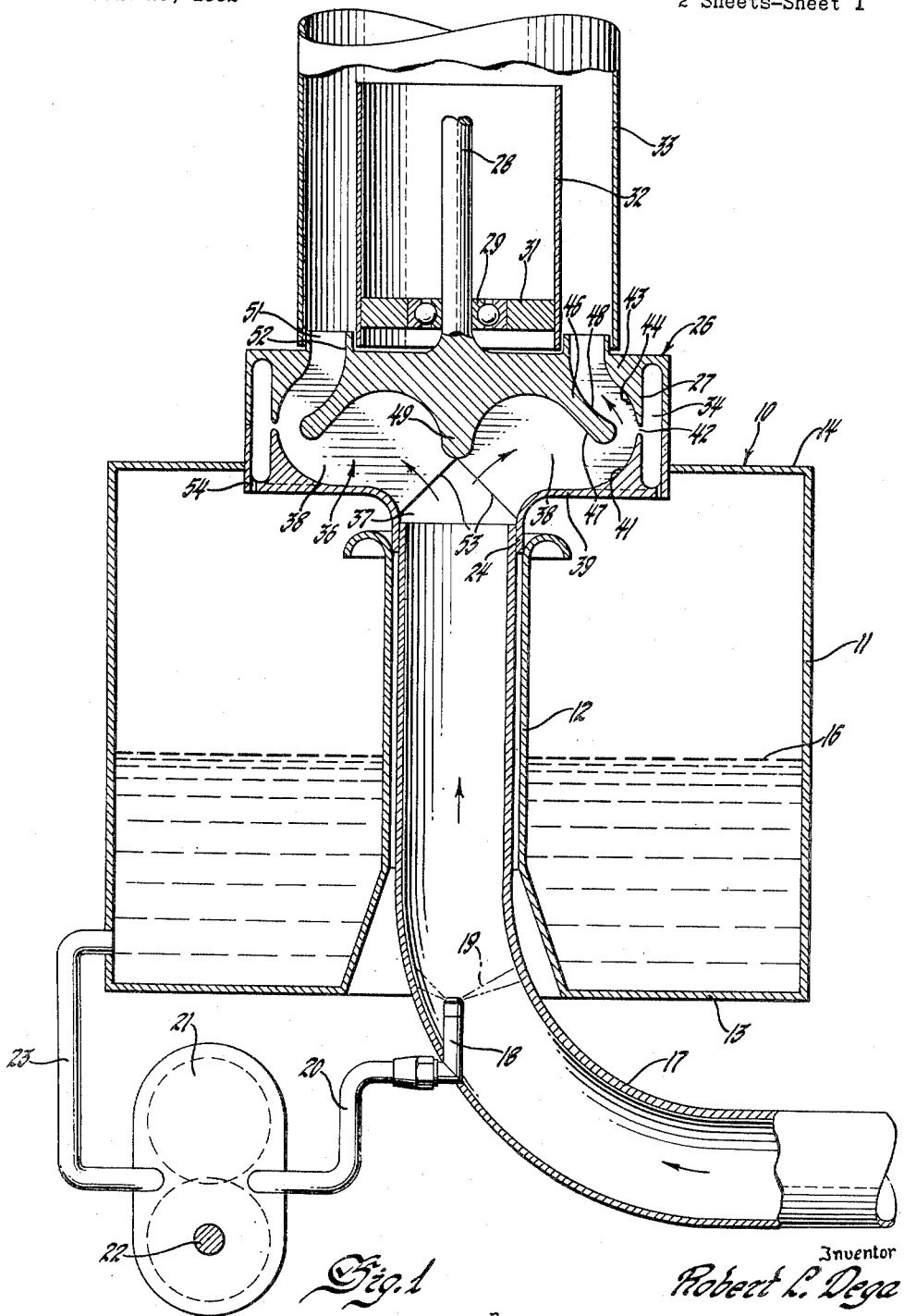
Figure 1 is a vertical sectional view of an exhaust gas treating apparatus diagrammatically illustrating one form which the invention may assume.

Referring particularly to the structure disclosed by Figure 1, there is illustrated an exhaust gas treating apparatus 10 employing a tank 11 having a tube or stand pipe member 12 secured in an opening in the bottom wall 13 thereof. The tube or stand pipe member 12 is adapted to extend almost to the top wall 14 of the tank 11 and the tank 11 is adapted to be partly filled with water or other suitable liquid up to a level indicated at 16. Projecting within the opening in the tank 11 which is formed by the tube 12 is an exhaust pipe or conduit 17 of a diesel or other internal combustion engine from which exhaust gas is discharged to the atmosphere by the conduit 17. Projecting into the tube 17 below the tank 11 is a spray nozzle 18 which is adapted to discharge a water spray 19 transversely with respect to the conduit 17. The spray nozzle 18 is supplied with water under suitable pressure by a discharge line 20 from a pump 21 which may be driven in any suitable manner by pump shaft 22. The pump 21 is supplied with water from the tank 11 by a supply line 23. The end of the conduit 17 projects somewhat beyond the upper end of the stand pipe 12 and within the flanged inlet 24 to a centrifugal separator indicated generally by the numeral 26. The flanged inlet 24 and the end of the tube 17 have a loose running fit.

The centrifugal separator 26 comprises a cylindrical body 27, the exterior surface of which projects within a circular opening formed in the upper wall 14 of the tank 11. The body 27 has an axially disposed shaft 28 projecting upwardly therefrom which is adapted to be driven by the engine from which exhaust is being discharged or in any other desired manner. The shaft 28 adjacent the body 27 is mounted in a roller bearing 29, the outer race of which is secured in a supporting ring 31 that is mounted at the periphery thereof within a tubular housing 32 for a portion of the shaft 28 and one or more of the bearings 29 therefor. The housing 32 is supported in any suitable manner within an exhaust discharge conduit indicated at 33. The exhaust discharge conduit 33 is adapted to discharge to the atmosphere exhaust gas supplied by the conduit 17. It will be apparent that rotation of the shaft 28 will rotate the body 27 within the opening in the tank 11 and about the end of the exhaust conduit 17.

The rotatable body 27 is formed in such manner as to provide an annular cavity 34 adjacent the periphery thereof and a sinuous cavity 36 radially inwardly of the annular cavity 34. The sinuous cavity 36 comprises an inlet 37 from which the cavity 36 extends radially outwardly at 38. The end wall 39 of the body 27 adjacent the inlet 37 is smoothly curved at 41 toward the middle circumferential portion of the annular cavity 34 and there terminates in an annular opening 42 by which the cavities 36 and 34 communicate. Beyond the opening 42 the opposite side wall 43 of the body 27 is further smoothly curved radially inwardly as is indicated at 44. The opposite wall 43 of the body 27 is formed in such a way as to provide a smoothly curved annular web 46 the outwardly disposed end of which restricts the cavity 36 in the vicinity of the opening 42. The surface 47 of the web 46 which is adjacent the wall 39 is smoothly curved and formed in such manner as to progressively reduce the size of the cavity 36 between the inlet 37 and the constriction which is located directly opposite the annular opening 42. The oppositely disposed smoothly curved surface 48 of the web 46 is formed in such a way as to slightly expand the cavity 36 opposite the wall 44 and beyond the constriction in the cavity formed adjacent the opening 42. A centrally disposed projection 49 may be formed in the wall 43 directly opposite the opening or inlet 37 and at the axis of rotation of the body 27 to axially divide the exhaust gas in all directions within the cavity 36. The wall 43 opposite the inlet 37 provides an annular outlet 51 from the cavity 36 which is adapted to discharge into the annular space between the housing 32 and the discharge conduit 33. The outlet 51 is formed between a pair of annular flanges 52 which project from the wall 43 in such manner as to provide a loose running fit with the adjacent surfaces of the housing 32 and conduit 33.

The cavities 34 and 36 are divided into a plurality of radially expanding compartments and passages respectively by a plurality of radially disposed webs 53 which extend between the front wall 39 and the rear wall 43 of the body 27. Each of the compartments of the annular cavity 34 which are formed by the webs 53 are provided with outlets indicated at 54 and communicating with the interior of the tank 11. It will be apparent that any liquid collected within the various compartments of the cavity 34 will be discharged by the outlets 54 into the tank 11.

When the engine discharges a column of exhaust gas through the conduit 17 and rotation of the shaft 22 operates the pump 21, a spray of water 19 will be discharged from the nozzle 18 into the column of exhaust gas within the conduit 17. It will be apparent that the exhaust gas within the conduit 17 will flow through the spray 19, will carry the small particles of water from the spray and will discharge the turbulent mixture into the inlet 37 of the centrifugal separator 26. The centrifugal separator 26 which is also being rotatably driven by the shaft 28 will tend to throw the mixture of exhaust gas and water outwardly from the inlet 37 through the sinuous cavity 36. The constriction formed between the end of the annular web 46 and the outlet 42 will tend to decrease the velocity of the exhaust gas at the maximum diameter of the cavity and just prior to the annular opening 42. This decrease in velocity takes place because the diameter of the cavity 36 is greatly increased in this region and the constriction is not great enough to increase the velocity. It will be apparent that the exhaust gas and any liquid or other particles therein will separate before reaching the outlet 42 and will flow through the outlet 42 into the cavity 34. The liquid and other substances so separated will flow into the tank 11 by centrifugal force and gravity through the outlets 54 from each compartment of the cavity 34. The exhaust gas from which the liquid and other particles have been so removed will continue to flow through the cavity 36 and from the separator 26 through the outlet 51. Thereafter the exhaust gas will be discharged into the atmosphere free of injurious, contaminating and inflammable substances by the discharge conduit 33.

The structure disclosed by Figure 2 also comprises a tank 11 from which liquid is supplied by a conduit 23 to a pump 21 for supplying water or other suitable liquid through a conduit 20 to a spray nozzle 18. The spray nozzle 18 also is adapted to discharge a liquid spray 19 across the interior of an exhaust conduit 17 leading from an internal combustion engine such as a diesel or other engine of this type. The conduit 17 may be secured upon the top of the tank 11 by brackets 61 secured to the tank 11 by bolts 60. The end of the conduit 17 has a running fit within the flanged inlet 62 by which the exhaust gas from the conduit 17 is discharged into a centrifugal separator indicated at 63. The centrifugal separator 63 includes a rotatable body 64 which is in many respects similar to the rotating body 27 of the centrifugal separator 26 disclosed by Figure 1. The rotatable body 64 is similar to the rotatable body 27 in the respect that it has an inlet 37 to an inwardly disposed sinuous cavity 36 having a relatively constricted outer peripheral portion which communicates with an outer annular cavity 34 through an annular outlet 42. The cavities 36 and 34 also are divided by radially disposed webs 53 into a plurality of separate passages and compartments which communicate through the annular outlet 42. Each of the compartments in the annular passage 34 is provided with an outlet for liquid indicated at 54. The cavity 36 in the structure disclosed by Figure 2 is in all respects similar to the cavity 36 in the structure disclosed by Figure 1 except that the annular outlet 66 in the structure disclosed by Figure 2 is formed in such a way as to extend radially outwardly rather than in parallel relation to the axis of the body as is disclosed by Figure 1. The outlet 66 is flanged at 67 in such a way as to project into the inlet 68 to a spirally formed collecting chamber 69 having a discharge end 71 that is arranged tangently with respect to the outlet opening 66. The upper wall 14 of the tank 11 is cut out in such a way as to provide an opening for receiving the lower parts of the rotating body 64 and the collecting chamber 69. The part of the rotating body 64 above the tank 11 is covered by a curved wall 72 which extends from the edge of the chamber 69 beyond the opposite end wall of the body 64 and there terminates in a curved flange forming a passage 73 having an annular inlet which is disposed directly opposite the outlets 54 from the various compartments of the cavity 34. The opposite ends of the passage 73 open into the tank 11 through the upper wall 14 of the tank 11.

It will be apparent that rotation of the body 64 will discharge separated liquid into the tank 11 above the liquid level therein and into the passage 73. Such liquid will be discharged into the passage 73 when the openings rotate into positions above the upper wall 14 of the tank 11. The body 64 is adapted to be rotated for so separating liquid from the exhaust gas within the conduit 17 by a shaft 74 supported by bearings 76 secured within a support 77 that is secured to the upper wall 14 of the tank 11 by bolts indicated at 78. The shaft 74 may be rotatably driven by a pulley 79 from any suitable source of power such as the engine from which exhaust gas is supplied by conduit 17.

The structure disclosed by Figure 2 is adapted to operate in the manner in which the structure disclosed by Figure 1 previously has been described to operate. The exhaust gas in the conduit 17 is mixed with water discharged by the nozzle 18, the exhaust gas and other substances are separated by the centrifugal separator 63, the exhaust gas is discharged from the outlet 71 to the atmosphere and the liquid and other substances separated are discharged into the tank 11 through the openings 54 and the passage 73. The liquid so collected in the tank 11 is again supplied to the nozzle 18 by the conduits leading to and from the pump 21.

The outlets 54 in the structure shown by Figures 1 and 2 may be made large enough to discharge liquid from the cavity 34 at a rate greater than the liquid collected within the cavity or they may be made smaller so that some liquid always will be present in the cavity 34 to prevent the escape of gas from the outlets 54. The outlets 54 also may be provided with trap means of any suitable kind such as the traps means disclosed by Figure 3.

Figure 3 discloses a valve body 81, a plurality of which may be secured to the rotating bodies in either of the centrifugal separators 26 or 63 in such a way that the inlets 82 to the valve bodies communicate with the outlet openings 54. The inlet 82 for each valve body 81 communicates with a valve chamber 83 containing a ball valve 84 which is adapted to move in response to centrifugal force resulting from rotation of the body to close the communication between the inlet 82 and the chamber 83. An outlet opening 86 is provided in each of the valve bodies 81 to permit the escape from the chambers 83 of any liquid which may enter the chambers upon opening of the valves 84. It is apparent that rotation of the bodies 81 will seat the ball valves 84 in such a way as to prevent the escape of any liquid from the outlet 86 until a considerable amount of liquid indicated at 88 has collected in the various compartments of the cavity 34. When the level of the liquid 88 extends inwardly to such extent that the centrifugal force affecting the liquid 88 is greater than the centrifugal force affecting the balls 84 then the balls 84 will open inwardly until the centrifugal force affecting the balls is equal to the centrifugal force affecting the liquid. A body of liquid 88 will always be retained in the various compartments of the cavity 34 so that it will be impossible for any gas to escape through the outlets 86.

I claim:

1. An apparatus for treating exhaust gas from internal combustion engines which comprises a liquid supply tank, means for spraying liquid from said supply tank into an engine exhaust conduit, centrifugal separating means partly disposed within and supported by said tank, said separating means being adapted to be connected to said exhaust conduit for receiving exhaust gas and said sprayed liquid from said conduit, liquid outlet means formed in said centrifugal separating means and connected to said tank for discharging separated liquid into said tank, said outlet means comprising trap means closing in response to centrifugal force to limit the flow of liquid from said separating means to retain therein sufficient liquid to prevent the escape of gas through said trap means.

2. Apparatus for treating exhaust gas from internal combustion engines comprising a rotatable body formed to provide a plurality of radially disposed passages therein extending outwardly from a common axial inlet at one side of said body, each of said passages being formed in said body to provide a curved part adjacent the periphery of said body with the outer convex curvature of said part tangent to a surface concentric with and parallel to the axis of rotation of said body, a liquid collecting cavity formed outwardly of said curved parts of said passages within said body and connected to the middle of the curved part of each of said passages, outlet passage means formed in said body for said cavity, a liquid collecting tank connected to said outlet passage means, exhaust conduit means for supplying exhaust gas to said axially disposed inlet to said passages in said body, and means for spraying liquid from said tank into said exhaust conduit means anterior to said inlet.

3. An apparatus for treating exhaust gas from internal combustion engines comprises a tank having an exhaust conduit extending substantially in parallel relation to the upper wall of said tank, a rotatable centrifugal separator in said conduit and having a peripheral portion thereof projecting into said tank, a gas collecting shroud for said separator extending around said separator and communicating with the gas outlet passages leading from said separator, said shroud having a portion extending into said tank and an outlet for the gas collected by said shroud and formed in a part of said shroud extending away from said tank, a liquid collecting flange formed around a part of said separator disposed externally of said tank and communicating with the liquid outlet openings leading from said separator and with the interior of said tank, and means for spraying liquid collected within said tank into said exhaust conduit anterior to said separator.

4. A centrifugal separator comprising a body adapted to rotate about the axis of revolution of the cylindrical exterior surface of said body, said body being formed to provide a pair of concentric cavities, one of said cavities being an elongated annular cavity formed adjacent the outer periphery of said body, the other being a sinuous cavity having an axially disposed inlet opening outwardly from one side of said body and an annular outlet around said axis and adjacent the opposite side of said body, said sinuous cavity being constricted between said inlet and said outlet in a circumferential region adjacent said annular cavity and being smoothly curved away from said inlet on the inlet side of said constricted region, said body being formed between said constricted region and said annular cavity to provide an inlet to said annular cavity from said constricted region, said body being formed to provide a plurality of webs extending from the axis toward the periphery of said body and dividing said sinuous and said annular cavities into a plurality of radially outwardly directed passages and compartments, each of said passages having restricted regions communicating with said compartments for collecting liquid therebeyond, said body being also formed to provide outlets from said compartments for centrifugally separated liquid collected in said compartments by the rotation of said body.

5. An apparatus for treating exhaust gas from internal combustion engines comprising a liquid supply tank having an opening in an upper wall thereof, rotatable centrifugal separating means projecting into said tank and closely fitting the edge of said wall forming said opening, said centrifugal separating means being formed to provide an axially disposed inlet and a peripherally disposed outlet, means supported by said tank and aligned with respect to said inlet for guiding and supporting an exhaust gas conduit in alignment with said inlet, liquid outlet means formed in said centrifugal separating means and extending within said tank for discharging into said tank liquid separated from said exhaust gas by said centrifugal separating means, outlet conduit means adapted to be connected to said peripherally disposed outlet for conducting exhaust gas from said separating means, and means associated with said tank for supplying liquid from said tank to said exhaust conduit means anterior to said axially disposed inlet.

6. A centrifugal separator comprising a body adapted to rotate about an axis and having an annular cavity formed therein and communicating with inlet opening means on one side of said body and outlet opening means adjacent the opposite side of said body, said inlet opening means being disposed adjacently and concentrically with respect to said axis of rotation, said outlet means being disposed remotely and concentrically with respect to the said axis of rotation, said annular cavity being enlarged radially and axially adjacent said inlet opening means and having an intermediate portion thereof constricted radially and extended axially therebeyond and between said inlet and said outlet opening means, said radially constricted and axially extended intermediate portion of said cavity being formed to provide a concentric annular bend having the opposite ends thereof extending radially inwardly toward said inlet and said outlet, radially disposed webs formed in said body and across said cavity between said inlet and said outlet, and an annular liquid collecting cavity formed in said body and radially outwardly of said bend and communicating with said bend through opening means formed between said cavities at the outer limits of said bend, and outlet means formed in said body and leading from said liquid collecting cavity.

References Cited in the file of this patent

UNITED STATES PATENTS

| 1,606,032 | Kolstrand | Nov. 9, 1926 |
| 1,610,668 | Freeman | Dec. 14, 1926 |
| 2,090,994 | Brandes | Aug. 24, 1937 |
| 2,126,481 | Lapp et al. | Aug. 9, 1938 |
| 2,195,707 | Nutting | Apr. 2, 1940 |
| 2,364,279 | Dodge | Dec. 5, 1944 |
| 2,542,095 | Rouget | Feb. 20, 1951 |
| 2,564,765 | Mercier | Aug. 21, 1951 |